United States Patent
Koyama

Patent Number: 6,115,067
Date of Patent: *Sep. 5, 2000

[54] APPARATUS FOR MAINTAINING OBJECT IMAGE SIZE DURING ZOOMING

[75] Inventor: Shinichi Koyama, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/926,409

[22] Filed: Sep. 2, 1997

Related U.S. Application Data

[63] Continuation of application No. 08/681,118, Jul. 22, 1996, abandoned, which is a continuation of application No. 08/287,678, Aug. 9, 1994, abandoned.

[30] Foreign Application Priority Data

Aug. 24, 1993 [JP] Japan .................................. 5-230884

[51] Int. Cl.[7] ............................. G03B 17/00; H04N 5/225
[52] U.S. Cl. ...................... 348/358; 348/170; 348/240; 348/350; 396/78
[58] Field of Search ..................... 348/358, 169, 348/240, 170, 350, 155, 207, 222, 345, 347, 352, 369; 396/77, 78; H04N 5/225, 5/232, 5/238; G03B 17/00

[56] References Cited

U.S. PATENT DOCUMENTS

| | | | |
|---|---|---|---|
| 4,734,781 | 3/1988 | Takahashi | 348/358 X |
| 5,043,817 | 8/1991 | Kinugasa et al. | 348/240 |
| 5,128,768 | 7/1992 | Suda et al. | 348/350 |
| 5,243,418 | 9/1993 | Kuno et al. | 348/170 |
| 5,267,034 | 11/1993 | Miyatabe et al. | 348/352 |
| 5,325,206 | 6/1994 | Fujita et al. | 348/347 |
| 5,355,163 | 10/1994 | Tomitaka | 348/234 |
| 5,392,088 | 2/1995 | Abe et al. | 348/169 X |
| 5,467,127 | 11/1995 | Jong-Pil | 348/358 |
| 5,473,369 | 12/1995 | Abe | 348/170 |
| 5,552,823 | 9/1996 | Kageyama | 348/155 |
| 5,587,739 | 12/1996 | Suzuki et al. | 348/347 |

Primary Examiner—Wendy Garber
Assistant Examiner—Ngoc-Yen Vu
Attorney, Agent, or Firm—Robin, Blecker & Daley

[57] ABSTRACT

An image processing apparatus for maintaining image size in the course of zooming comprises an input part for inputting an image signal and focusing the image in an image plane, a detection part for setting a detection area and detecting a motion vector of the image in the detection region in said image plane, and a changing part for changing an angle of view of the image according to an output of the detection part. The changing part includes a zoom motor for changing the position of a zoom lens.

26 Claims, 8 Drawing Sheets

APPARATUS FOR MAINTAINING OBJECT IMAGE SIZE DURING ZOOMING

This is a continuation application under 37 CFR 1.62 of prior application Ser. No. 08/681,118 filed on Jul. 22, 1996 (abandoned); which is a continuation of Ser. No. 08/287,678 filed on Aug. 9, 1994 (abandoned).

BACKGROUND OF THE INVENTION

1. Field of the Invention

The present invention relates to an image processing apparatus, and more particularly, to a process of changing an angle of view of image information obtained by, for example, a video camera.

2. Description of the Related Art

FIG. 1 illustrates a recording system for a conventional camera-integrated video recorder.

Referring to FIG. 1, reference numeral 1 denotes a zoom lens. Reference numeral 2 denotes a zoom motor for driving the zoom lens 1. Reference numeral 3 denotes an image sensor for converting an obtained optical image into an electrical image signal. Reference numeral 4 denotes a camera signal processing circuit for reproducing luminance and color information of the electrical image signal from the image sensor 3. Reference numeral 5 denotes an electronic viewfinder (hereinafter referred to as an EVF) for displaying the obtained image signal. Reference numeral 6 denotes a video tape recorder (hereinafter referred to as a VTR) for recording the obtained image signal on a recording medium, such as a magnetic tape. Reference numeral 7 denotes a system control circuit for controlling the entirety of the camera-integrated video recorder. Reference numeral 8 denotes an operation portion for inputting various types of data items.

The recording operation of the above-described camera-integrated video recorder will be described below.

First, the operator catches an object while looking into EVF 5. At the time, the operator sets an image of the object at a desired angle of view by operating a zoom key provided in the operation portion 8.

The system control circuit 7 moves the zoom lens 1 by driving the zoom motor 2 on the basis of the zooming information from the operation portion 8 to obtain a desired angle of view.

Next, the operator operates a recording starting key provided in the operation portion 8 so as to allow the image sensor 3 to convert the optical image formed through the zoom lens 1 into an electrical image signal, the obtained electrical image signal being output to the camera signal processing circuit 4.

The camera signal processing circuit 4 reproduces luminance and color information of the image signal from the image sensor 3 and outputs the obtained information to both the EVF 5 and the VTR 6.

The VTR 6 records the image signal which has been processed by the camera signal processing circuit 4 on a magnetic tape in a predetermined format.

During operation, the operator may desire to change the angle of view of the image. At that time, the angle of view can be changed by operating the zoom key provided in the operation portion 8.

More specifically, the system control circuit 7 drives the zoom motor 2 on the basis of the zoom information from the operation portion 8 to move the zoom lens 1 at a position where the angle of view desired by the operator can be obtained. During that time, the recording operation continues.

However, in the above-described conventional apparatus, when the object moves forward or backward, the size of the object in the image thereby changes, making it hard for the operator to view the object. To avoid such a deficiency, the operator must adjust the zoom lens 1 by continuously operating the zoom key provided in the operation portion 8.

SUMMARY OF THE INVENTION

In view of the aforementioned problems of the prior art, a primary object of the present invention is to provide an image processing apparatus which is designed to automatically change an angle of view when an object moves forward or backward so as to allow the object to be imaged, recorded or reproduced always at the same size (hereinafter, this function being referred to as an automatic framing function).

In a preferred embodiment of the present invention, the image processing apparatus includes input means for inputting an image signal, detection means for detecting a motion vector of the image signal, and changing means for changing an angle of view of the image signal according to an output of the detection means.

Other objects, features and advantages of the invention will become apparent from the following detailed description taken in conjunction with the accompanying drawings.

DETAILED DESCRIPTION OF THE PREFERRED EMBODIMENTS

A first embodiment of the present invention will be described below.

Figure 2:
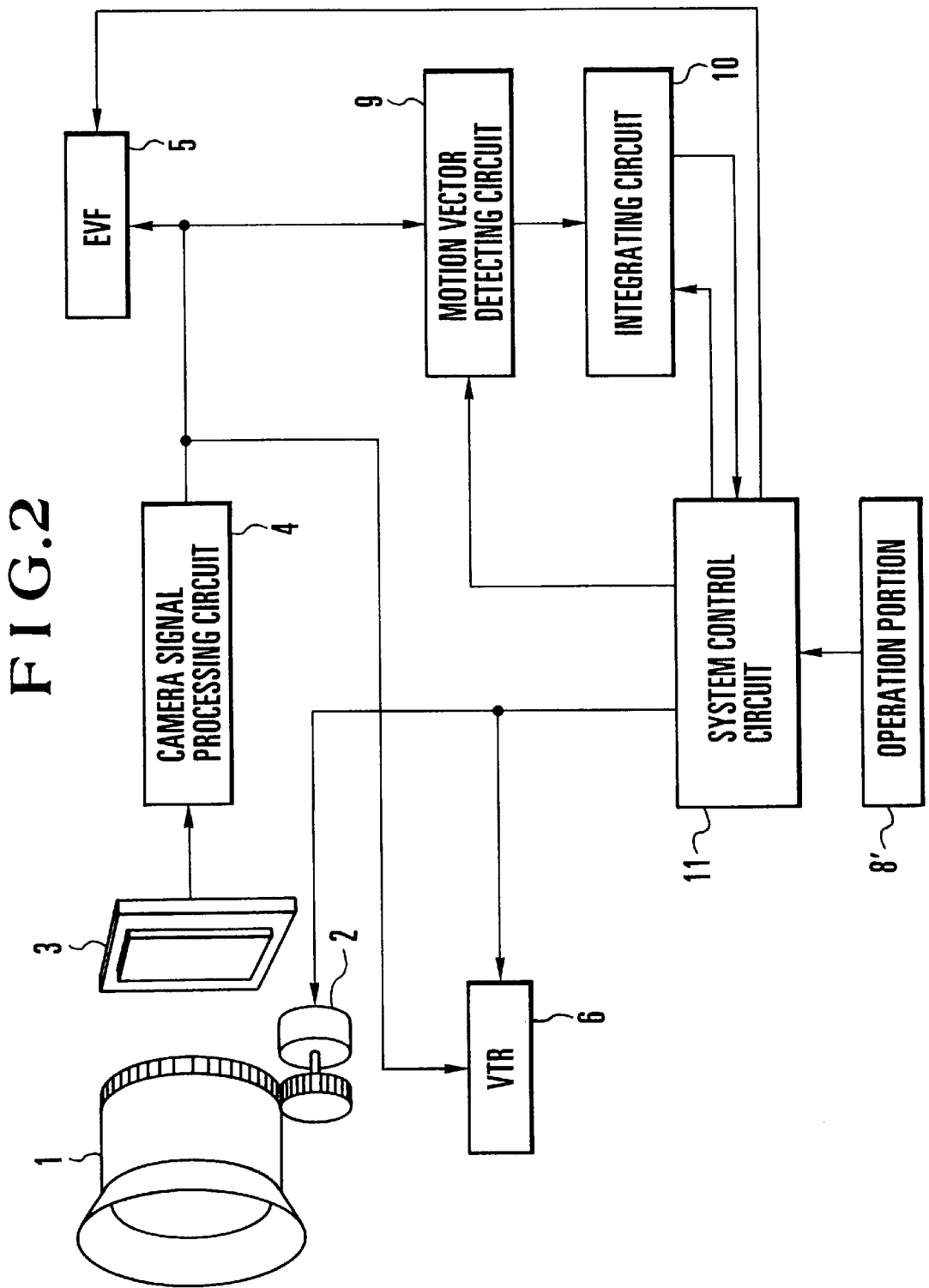
FIG. 2 is a block diagram of a first embodiment of a camera-integrated video recorder according to the present invention.

FIG. 2 is a block diagram of a camera-integrated video recorder having an automatic framing function according to the first embodiment of the present invention.

Figure 1:
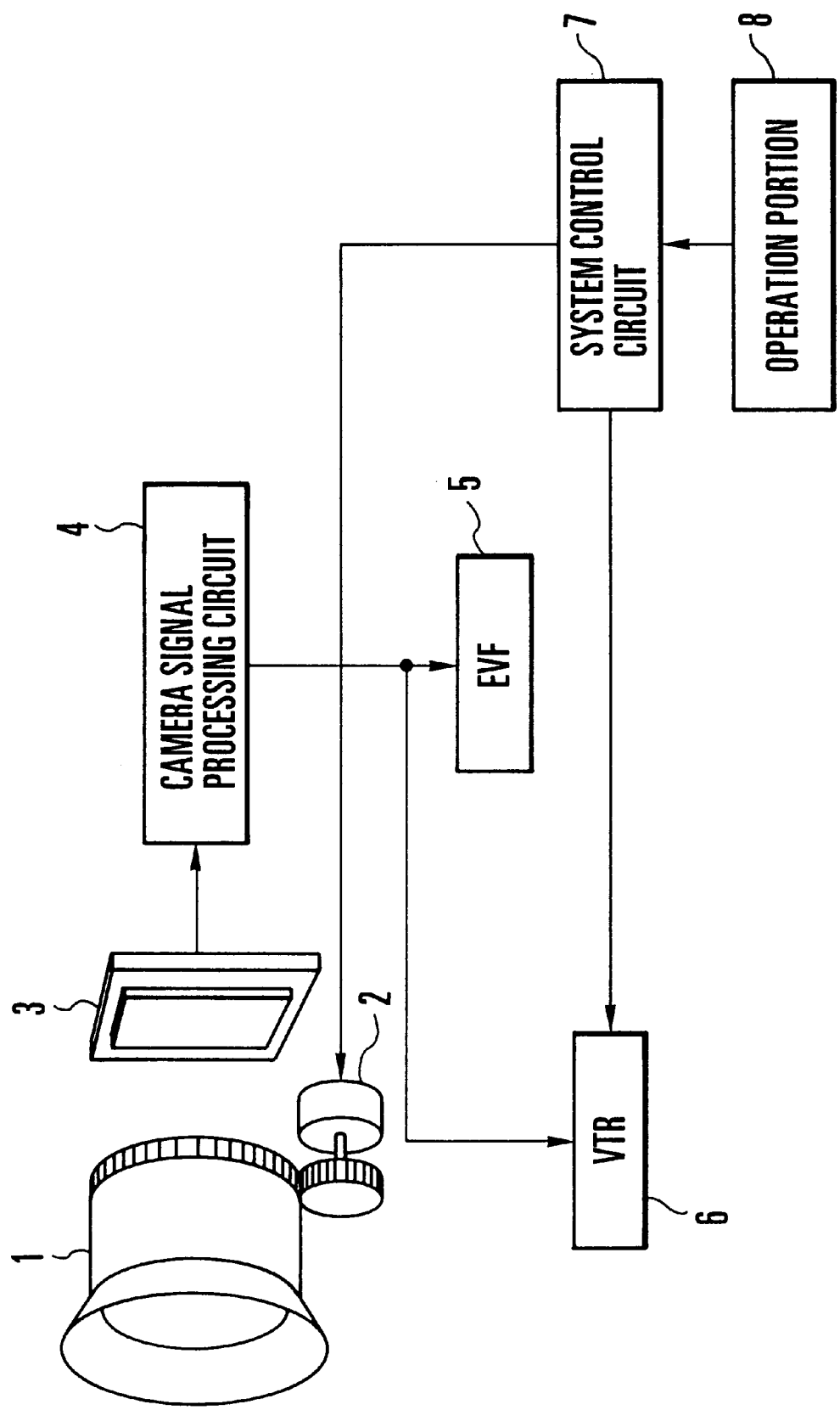
FIG. 1 illustrates a recording system of a conventional camera-integrated video recorder.

Reference numerals in FIG. 2 identical to those in FIG. 1 represent similar or identical elements.

The structure shown in FIG. 2 differs from that shown in FIG. 1 in that it further includes a motion vector detecting circuit 9 and an integrating circuit 10.

In compliance with the above change, the processing of a system control circuit 11 differs from that of the system control circuit 7 shown in FIG. 1, and an automatic framing function execution key is added in an operation portion 8' to execute the automatic framing function.

The motion vector detecting circuit 9 detects a motion of an image from the image signal obtained by the image sensor 3. The integrating circuit 10 integrates the output signal from the motion vector detecting circuit 9. The integrated value obtained by the integrating circuit 10 is output to the system control circuit 11. The system control circuit 11 changes the position of the zoom lens 1 by driving the zoom motor 2 on the basis of the integrated value to adjust the angle of view of the object.

Figure 3:
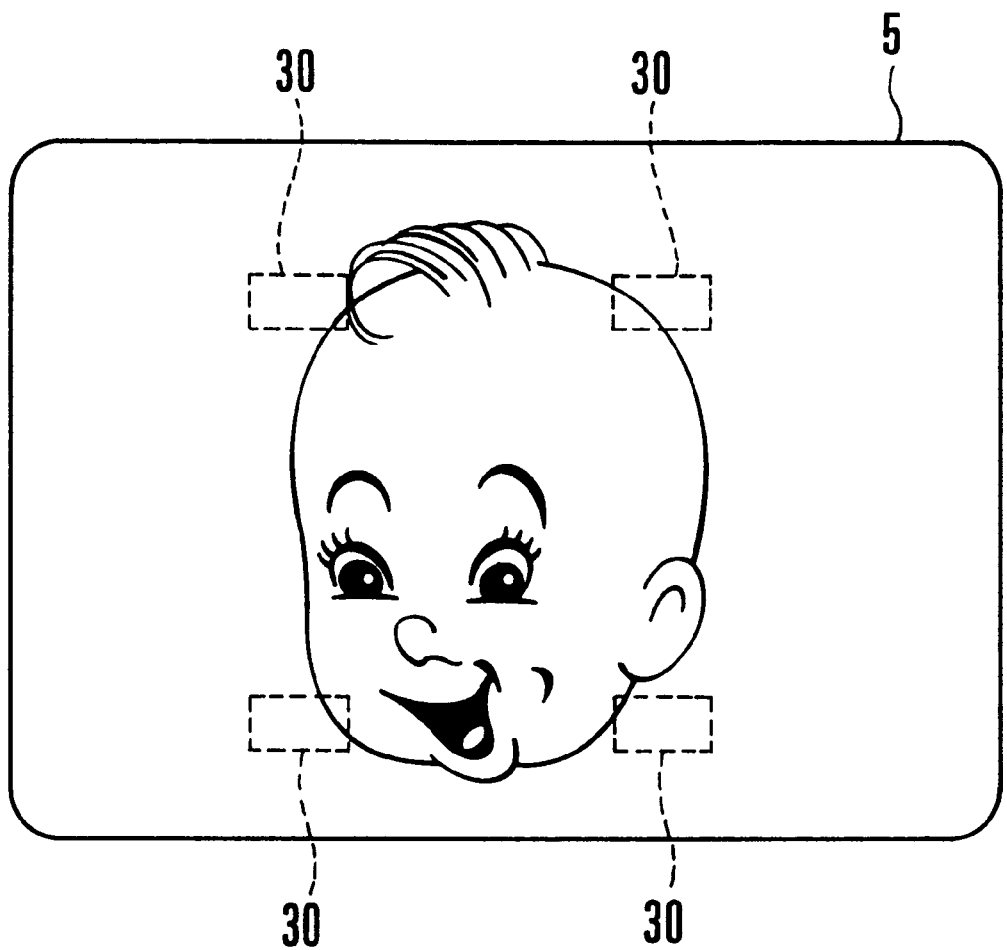
FIG. 3 illustrates an example of an image displayed by an EVF 5 when an automatic framing function is executed.

FIG. 3 illustrates an image displayed on the EVF 5 when the automatic framing function is being executed.

In FIG. 3, reference numerals 30 denote measuring areas where the motion vector is detected. The measuring areas 30 are displayed by superimposing frame images representative of the measuring areas 30 on the obtained image.

Display of the measuring areas 30 is controlled by the system control circuit 11.

Figure 4:
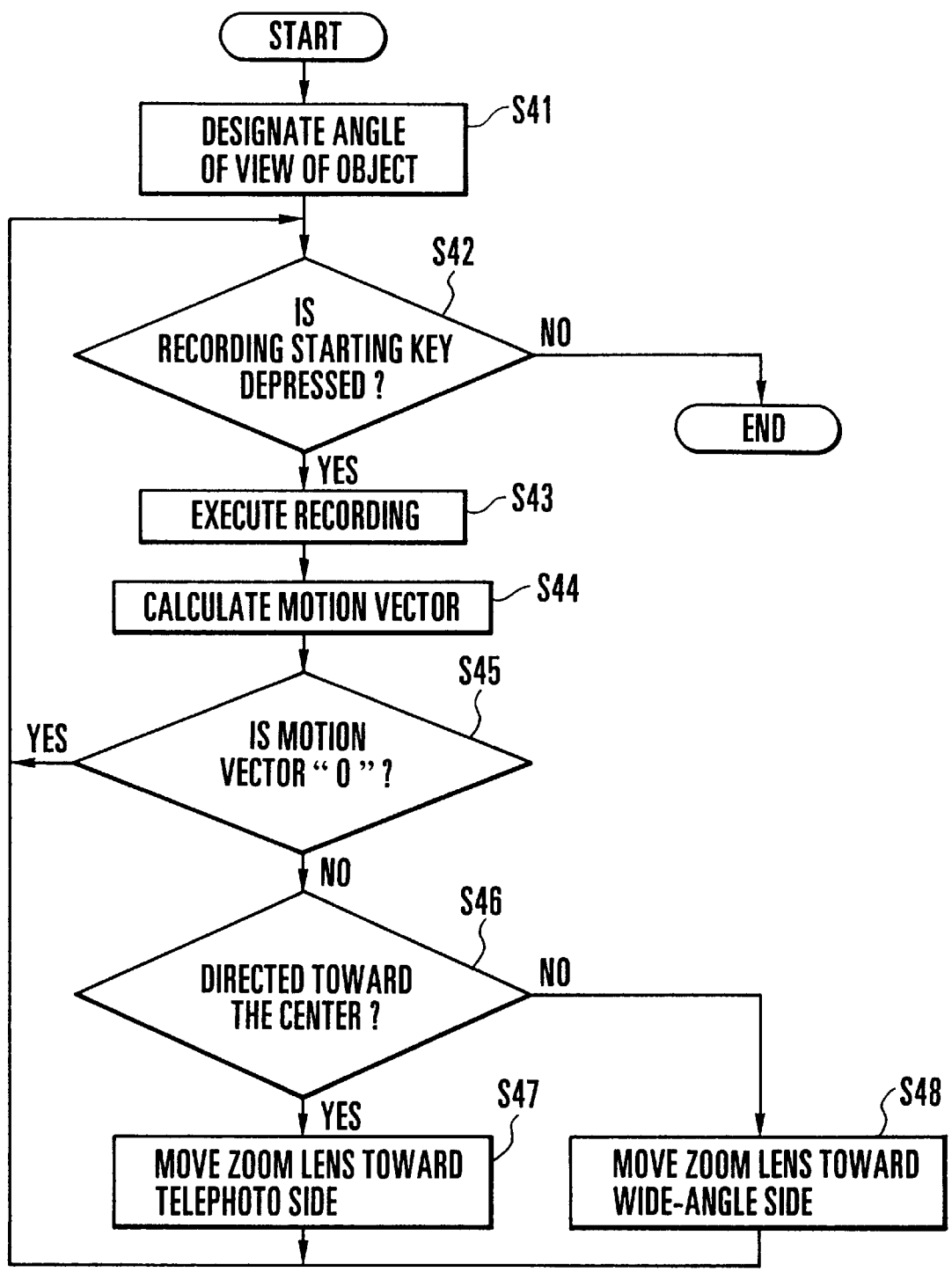
FIG. 4 is a flowchart showing the operation of the automatic framing function performed in the first embodiment.

The operation of the automatic framing function in the camera-integrated video recorder arranged in the manner described above will be described below with reference to FIG. 4.

When the operator sets a mode setting key provided in the operation portion 8' to the camera photographing mode and operates the automatic framing function executing key provided in the operation portion 8', the flow is started.

First, in step S41, the operator catches the object while looking at the image displayed in the EVF 5, and designates the angle of view of the object using the zoom key provided in the operation portion 8'.

The system control circuit 11 receives zooming information from the operation portion 8' and moves the zoom lens 1 by driving the zoom motor 2 to adjust the angle of view. At that time, the angle of view is adjusted in such a way that the contour portions of the object that the operator desires to photograph at a fixed size are overlapped on the measuring areas 30 shown in FIG. 3. Incidentally, the measuring areas 30 shown in FIG. 3 are not displayed in the normal operation mode (during the operation in which automatic framing function is not executed).

In step S42, it is determined whether or not the recording starting key provided in the operation portion 8' is depressed. If the recording starting key is not depressed, the flow is ended.

If it is determined in step S42 that the recording starting key is depressed, the process proceeds to step S43.

In step S43, the obtained image signal is recorded on the magnetic tape by the VTR 6.

In step S44, the motion vector detecting circuit 9 computes a difference between the present field and the previous field at each of the measuring areas (see FIG. 3) of the input image signal, and calculates the motion of the image at each of the measuring areas in the form of a magnitude and a phase of the vector on the basis of the obtained difference.

In step S45, it is determined by the system control circuit 11 whether or not the motion vector is "0".

The system control circuit 11 determines whether or not the motion vector is "0" on the basis of the value obtained by integrating the output of the motion vector detecting circuit 9 by the integrating circuit 10. When there is no motion of the object, the motion vector is "0".

If it is determined in step S45 that the motion vector is "0", the process returns to step S42.

If it is determined in step S45 that the motion vector is not "0", i.e., if the object has moved forward or backward the camera during operation, the process proceeds to step S46.

When the object moves forward or backward, the motion vectors of the four measuring areas (see FIG. 3) are all directed toward the center or outward at the same time.

Hence, in step S46, it is determined whether or not the motion vectors of the four measuring areas 30 are directed toward the center.

If it is determined in step S46 that the motion vectors are directed toward the center, the process proceeds to step S47. The motion vectors being directed toward the center obviously indicates that the object is moving away.

In step S47, the zoom lens 1 is moved toward the telephoto side so that the motion vectors of the measuring areas 30 become "0".

If it is determined in step S46 that the motion vectors are directed outward, the process proceeds to step S48. The motion vectors being directed outward indicates that the object is coming near.

In step S48, the zoom lens 1 is moved toward the wide-angle side so that the motion vectors of the measuring areas 30 become "0".

When the process of step S47 or step S48 is completed, the process returns to step S42.

In the above-described first embodiment, the object has moved simply forward or backward. However, in an actual case, the object often moves to the left or right while moving forward or backward. In that case, the operator moves the camera to the left or right so that the object can be recorded at the same position of the image plane. At that time, since the motion vectors are directed toward the center or outward, as in the case of the above embodiment, the automatic framing function can be executed in the same manner as the above-described manner. However, there is overshoot in the operation conducted by the human being. In the first embodiment, a determination as to whether the motion vectors are present is thus made by the integrating circuit 10 using the average means of the motion vectors to cancel such over shoot.

A second embodiment of the present invention will be described below.

The second embodiment allows the operator to automatically frame the image of an object at a desired size. Further, the second embodiment allows the operator to perform automatic framing function reliably even when the object moves to the left or right while moving forward or backward.

Figure 5:
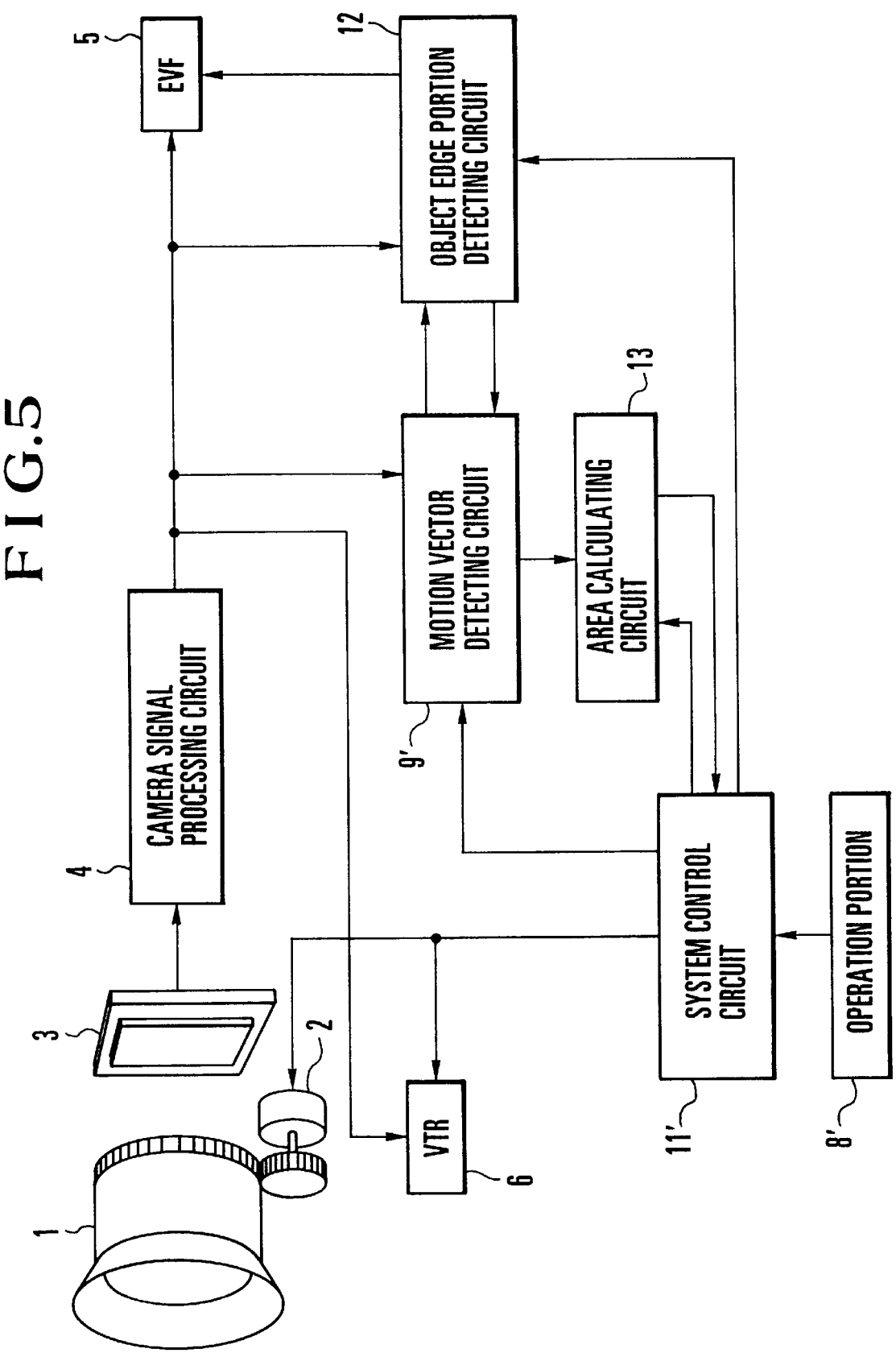
FIG. 5 is a block diagram of a second embodiment of the camera-integrated video recorder according to the present invention.

FIG. 5 is a block diagram of a second embodiment of the camera-integrated video recorder having the automatic framing function according to the present invention.

Reference numerals in FIG. 5 identical to those in FIG. 2 represent similar or identical elements, description thereof being omitted.

The structure shown in FIG. 5 differs from that shown in FIG. 2 in that it further includes an object edge portion detecting circuit 12 and an area calculating circuit 13.

The object edge portion detecting circuit 12 inputs the motion vectors detected by a motion vector detecting circuit 9', and determines whether or not there is an edge portion of the object image in the portion in motion.

When the edge of the object is detected by the object edge portion detecting circuit 12, the four measuring areas 30 are displayed at the edge portions of the object on the EVF 5, as shown in FIG. 3. The four measuring areas 30 are set at positions where the relation shown in FIG. 6 is established, i.e., at four corners of a square or rectangle (an area calculating area 60).

Figure 6:
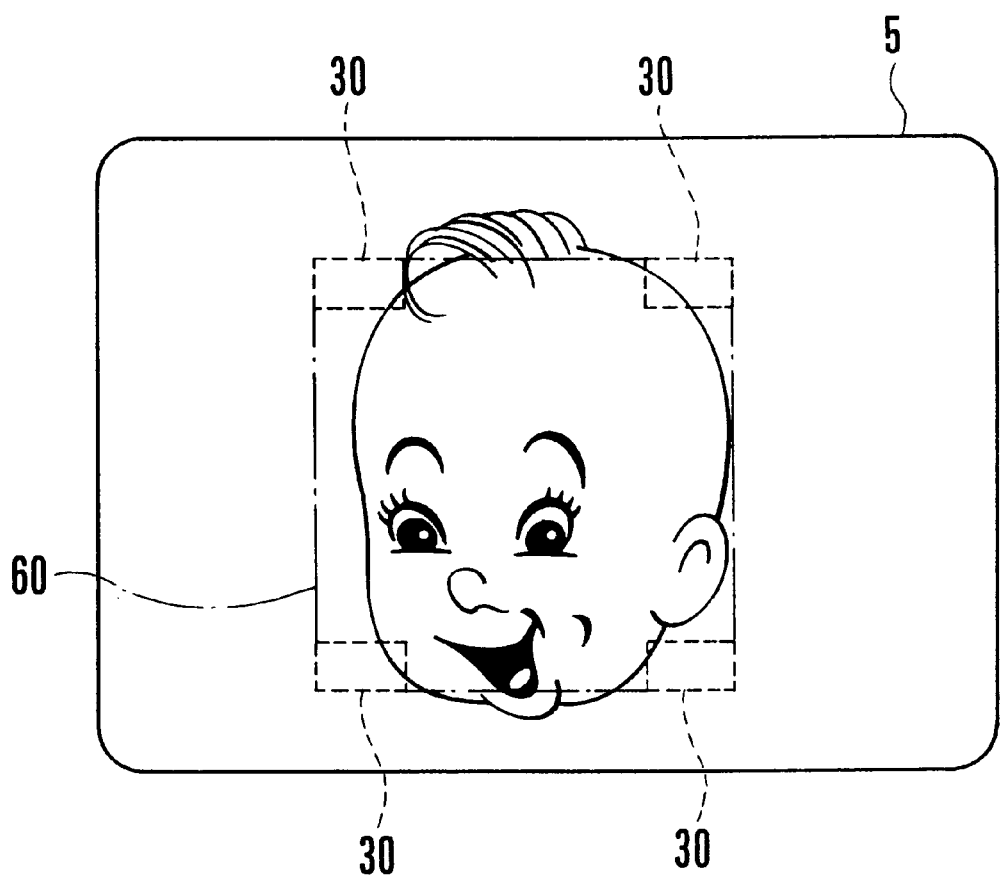
FIG. 6 illustrates a method of setting measuring areas 30 and an area obtained by an area calculating circuit 13 in the second embodiment.

The area calculating circuit 13 calculates the area of the area calculating area 60 shown in FIG. 6. The area calculating circuit 13 calculates the area value of the area calculating area 60 on the basis of the results of the motion vector detecting circuit 9'.

The results of the calculation are output to the system control circuit 11'.

The system control circuit 11' change the position of the zoom lens 1 by driving the zoom motor 2 on the basis of the calculated area value to adjust the angle of view of the object.

Figure 7:
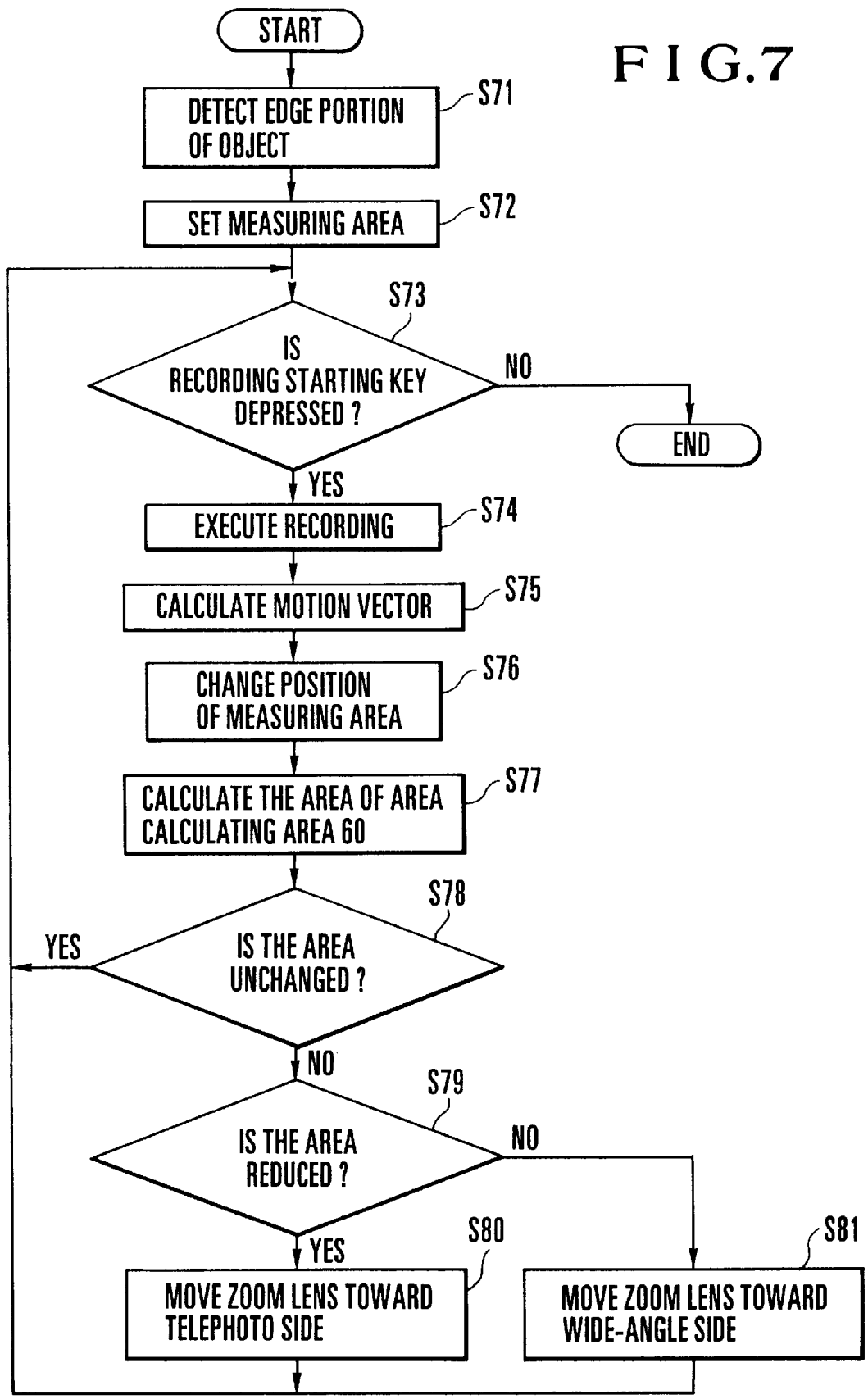
FIG. 7 is a flowchart showing the operation of the automatic framing function performed in the second embodiment.

The operation of the automatic framing function of the camera-integrated video recorder arranged in the manner described above will be described with reference to FIG. 7.

When the operator sets a mode setting key provided in the operation portion 8' to the camera photographing mode and operates the automatic framing function executing key provided in the operation portion 8', the flow is started.

First, in step S71, the object edge portion detecting circuit 12 detects the edge portion of the object.

In step S72, the measuring areas 30 are set according to the results of the detection conducted in step S71, and the area of the area calculating area 60 made up of the measuring areas is calculated. The calculated area becomes a reference value.

The measuring areas 30 are displayed on the EVF 5 in the same manner as that of the first embodiment.

In step S73, it is determined whether or not the recording starting key provided in the operation portion 8' is depressed. If the recording starting key is not depressed, the flow is ended.

If it is determined in step S73 that the recording staring key is depressed, the process proceeds to step S74.

In step S74, the obtained image signal is recorded on the magnetic tape by the VTR 6.

In step S75, the motion vector detecting circuit 9 computes a difference between the present field and the previous field at each of the measuring areas (see FIG. 3) of the input image signal, and calculates the motion of the image at each of the measuring areas in the form of a magnitude and a phase of the vector on the basis of the obtained difference.

In step S76, the object edge portion detecting circuit 12 changes the position of the measuring areas 30 on the basis of the results of the detection conducted in step S75.

In step S77, the area calculating circuit 13 calculates the area value of the area calculating area 60.

In step S78, it is determined whether the reference value obtained in step S72 coincides with the area value obtained in step S77 by comparing the area value with the reference value.

If it is determined in step S78 that the reference value coincides with the area value obtained in step S77, the process returns to step S73. If the reference value does not coincide with the area value, the process proceeds to step S79.

In step S79, it is determined whether or not the area value obtained in step S77 is less than the reference value.

If it is determined in step S79 that the area value obtained in step S77 is less than the reference value, the process proceeds to step S80.

In step S80, it is determined that the object is moving away, and the zoom lens 1 is moved toward the telephoto side so that the area value becomes coincident with the reference value.

If it is determined in step S79 that the area value obtained in step S77 is greater than the reference value, the process proceeds to step S81.

In step S81, it is determined that the object is coming near, and the zoom lens 1 is moved toward the wide-angle side so that the area value becomes coincident with the reference value. When the process of step S80 or step S81 is completed, the process returns to step S73.

In the second embodiment, even when the object moves forward or backward or to the left or right, the size of the object can be maintained to a desired size.

Various changes and modifications may be made in the invention without departing from the spirit and scope thereof.

For example, although the automatic framing function is achieved in the above embodiments by adjusting the zoom lens during recording, it may also be executed by an electric processing (e.g., an electronic zooming).

If an electronic zooming circuit is provided, the automatic framing function can be executed during recording and reproduction.

An example of a structure for executing the automatic framing function during reproduction will be described with reference to FIG. 8.

Figure 8:
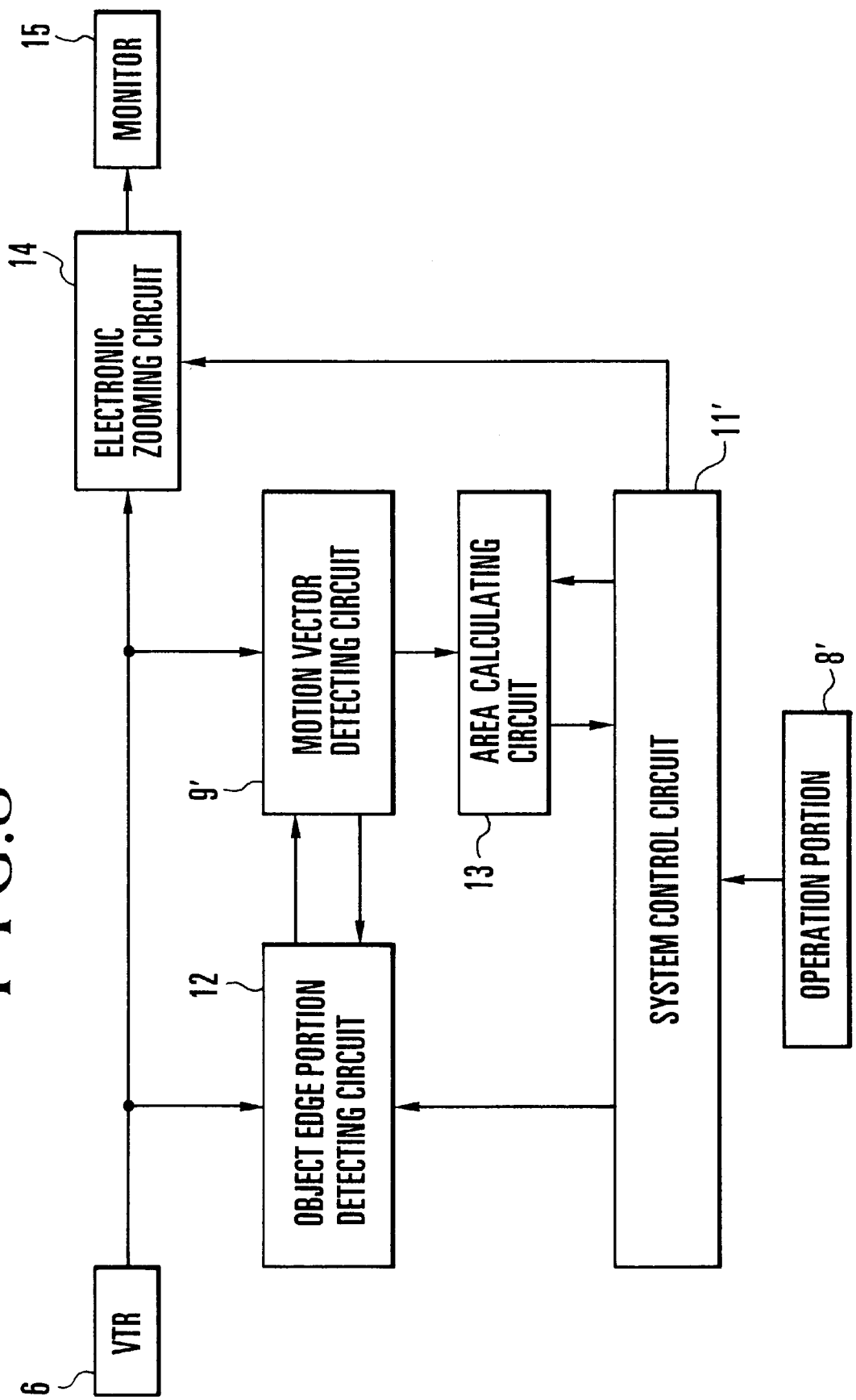
FIG. 8 is a block diagram of a reproducing apparatus having the automatic framing function showing another embodiment of the present invention.

Reference numerals in FIG. 8 identical to those in FIG. 5 represent similar or identical elements, description thereof being omitted.

The structure shown in FIG. 8 differs from the structure shown in FIG. 5 in that it includes an electronic zooming circuit 14 so that the automatic framing function can be executed during reproduction.

The object edge portion detection circuit 12 and the motion vector detecting circuit 9' do not input the image signal obtained by photography but input the image signal reproduced by the VTR 6, unlike in the case of the first or second embodiment.

The object edge portion detecting circuit 12 and the motion vector detecting circuit 9' obtain the motion vectors and the area value of a predetermined area, respectively, by performing the same processes as those of the second embodiment. The system control circuit 11' controls the electronic zooming circuit 14 on the basis of the results of the measurements to electrically zoom up or down the reproduced image, thereby performing the automatic framing function.

The automatically framed image is displayed on a monitor 15.

Thus, the automatic framing function can be executed during reproduction as well as recording by providing the electronic zooming circuit.

In other words, the foregoing description of the embodiments has been given for illustrative purposes only and is not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. An image processing apparatus comprising:
   a) input means for inputting an image signal;
   b) detection means for setting a plurality of detection areas in an image screen and detecting motion vectors of the image signal in the detection areas, respectively;
   c) operating means for operating a change of a size of an image in a predetermined image frame set in the image screen on the basis of a distribution and changes of directions and scalars of the motion vectors; and
   d) control means, in an automatic framing mode, for controlling a magnification of the image on the image screen so as to substantially keep the size of the image in the image screen constant according to an output of said operating means, said control means displaying the predetermined image frame only when the automatic framing mode is selected and turning off the predetermined image frame except during the automatic framing mode.

2. An image processing apparatus according to claim 1, wherein said input means has imaging means for converting an optical image into an electrical signal.

3. An image processing apparatus according to claim 1, wherein said input means has reproduction means for reproducing the image signal recorded on a recording medium.

4. An image processing apparatus according to claim 1, wherein said control means optically controls the magnification of the image.

5. An image processing apparatus according to claim 1, wherein said control means electrically controls the magnification of the image.

6. An image processing apparatus according to claim 1, wherein said control means controls the magnification of the image in the case that the motion vectors detected by said detection means are directed toward a center of a detecting area or a radial outward direction.

7. An image processing apparatus according to claim 6, wherein said control means increases the magnification of the image when said motion vectors are directed toward the center and reduces the magnification of the image when the motion vectors are directed in said radial outward direction.

8. An image processing apparatus according to claim 1, wherein said detection means detects motion of an object image in the image signal.

9. An image processing apparatus according to claim 1, further comprising recording means for recording the image signal of which the magnification has been controlled by said control means on a recording medium.

10. An image processing apparatus according to claim 1, wherein said control means calculates an area value of a predetermined area in the image signal on the basis of the detection made by said detection means, and said control means controls the magnification on the basis of the calculation.

11. An image processing apparatus according to claim 10, wherein said control means increases the magnification of the image when the area value is less than a predetermined value, and reduces the magnification of the image when the area value is greater than said predetermined value.

12. An image sensing apparatus, comprising:
   a) image sensing means for sensing an image formed on an image sensing plane and outputting an image signal corresponding to the image;
   b) detection means for detecting a plurality of movement information corresponding to each of a plurality of detection areas in the image signal and discriminating a distribution and changes of directions and scalars of the movement information on the image sensing plane;
   c) operation means for operating a change of a size of the image in a predetermined image frame set on the image sensing plane on the basis of the distribution; and
   d) control means, in an automatic framing mode, for controlling the size of the image so as to substantially maintain the size of the image at a predetermined value according to an output of said operation means, said control means displaying the predetermined image frame only when the automatic framing mode is selected and turning off the predetermined image frame except during the automatic framing mode.

13. An image sensing apparatus according to claim 12, wherein said image sensing means is a CCD.

14. An image sensing apparatus according to claim 13, further comprising reproduction means for reproducing the image signal recorded on a recording medium.

15. An image sensing apparatus according to claim 12, wherein said control means optically controls an angle of view of the image.

16. An image sensing apparatus according to claim 12, wherein said control means electrically controls an angle of view of the image.

17. An image sensing apparatus according to claim 12, wherein said control means changes a magnification of the image when motion vectors of the movement information detected by said detection means are directed toward a center or in an opposite direction.

18. An image sensing apparatus according to claim 17, wherein said control means increases the magnification of the image when the motion vectors are directed toward the center and decreases the magnification of the image when the motion vectors are directed outward.

19. An image sensing apparatus according to claim 12, further comprising recording means for recording the image signal whose size has been controlled by said control means on a recording medium.

20. An image sensing apparatus according to claim 19, wherein said control means increases the size of the image when an area value is less than the predetermined value, and decreases the size of the image when the area value is greater than the predetermined value.

21. An image processing apparatus, comprising:
   a) image inputting means inputting an image;
   b) detection means for detecting a plurality of movement information corresponding to each of a plurality of detection areas and discriminating a distribution and changes of directions and scalars of the movement information on an image screen;
   c) computing means for operating a change of a size of the image in a predetermined image frame set on the image screen on the basis of the distribution;
   d) control means, in an automatic framing mode, for controlling a magnification of the image so as to automatically keep the size of the image to a constant value according to an output of said computing means; and
   e) display means for displaying the image controlled in the size by said control means, wherein said control means controls said display means displaying the predetermined image frame only when the automatic framing mode is selected and turning off the predetermined image frame except during the automatic framing mode.

22. An apparatus according to claim 21, further comprising reproduction means for reproducing the image signal recorded on a recording medium.

23. An apparatus according to claim 21, wherein said control means optically controls the magnification of the image.

24. An apparatus according to claim 21, wherein said control means electrically controls the magnification of the image.

25. An apparatus according to claim 21, wherein said control means controls the magnification of the image when motion vectors of the movement information detected by said detection means are directed toward a center or in an opposite direction.

26. An apparatus according to claim 21, wherein said control means increases the magnification of the image when motion vectors of the movement information are directed toward a center and decreases the magnification of the image when the motion vectors of the movement information is directed outward.

* * * * *